United States Patent [19]

Schwellenbach

[11] 4,262,549
[45] Apr. 21, 1981

[54] VARIABLE MECHANICAL VIBRATOR

[76] Inventor: Donald D. Schwellenbach, 4520 W. Bryce Lane, 4520 W. Bryce La., Ariz. 85301

[21] Appl. No.: 904,313

[22] Filed: May 10, 1978

[51] Int. Cl.³ .................. B06B 1/16; B65G 27/20
[52] U.S. Cl. .................................. 74/87; 74/61; 209/367; 366/128
[58] Field of Search ............. 74/61, 87; 198/770; 209/366.5, 367; 310/81; 366/128

[56] References Cited

U.S. PATENT DOCUMENTS

| | | | |
|---|---|---|---|
| 2,748,609 | 6/1956 | Olson | 74/61 |
| 3,598,029 | 8/1971 | Paramythioti | 74/87 |
| 3,610,118 | 10/1971 | Engelhard | 74/87 |
| 3,670,631 | 6/1972 | Gaylord | 74/61 |
| 3,772,923 | 11/1973 | Burt | 74/61 |
| 3,783,701 | 1/1974 | Steprath et al. | 74/87 |
| 3,920,222 | 11/1975 | Brander | 74/87 |

FOREIGN PATENT DOCUMENTS

| | | | |
|---|---|---|---|
| 1158429 | 11/1963 | Fed. Rep. of Germany | 74/87 |
| 278581 | 10/1930 | Italy | 74/61 |

Primary Examiner—Lawrence J. Staab
Attorney, Agent, or Firm—LaValle D. Ptak

[57] ABSTRACT

A variable mechanical vibrator includes a first eccentric weight fixed to a rotatably mounted shaft. A second eccentric weight is rotatably mounted on the shaft, and the two weights are rotated together under control of mating engagement abutments, one carried by the shaft and one carried by or comprising a surface of the second eccentric weight. In one embodiment, first and second prime movers are used to rotate the shaft and the second eccentric weight, respectively; and when primary rotation of the shaft is effected by the first prime mover, the first and second eccentric weights are diametrically oppositely aligned with respect to one another on the shaft providing a balanced operation. In this mode of operation, the abutment carried by the shaft drives the abutment on the second weight to rotate such weight set with the shaft. A second mode of operation is effected under control of the second prime mover which rotates the second eccentric weight to a point where the engagement abutments engage one another in a position where the second eccentric weight and the first eccentric weight are substantially aligned with one another on the shaft to create an unbalanced condition. In this mode, the abutment on the second eccentric weight drives an abutment affixed to the shaft to rotate the shaft with the second weight. Another embodiment uses only a single prime mover, and changes in the relative positions of the two weights are effected by static and rotational inertia as the prime mover is speeded up and slowed down.

11 Claims, 22 Drawing Figures

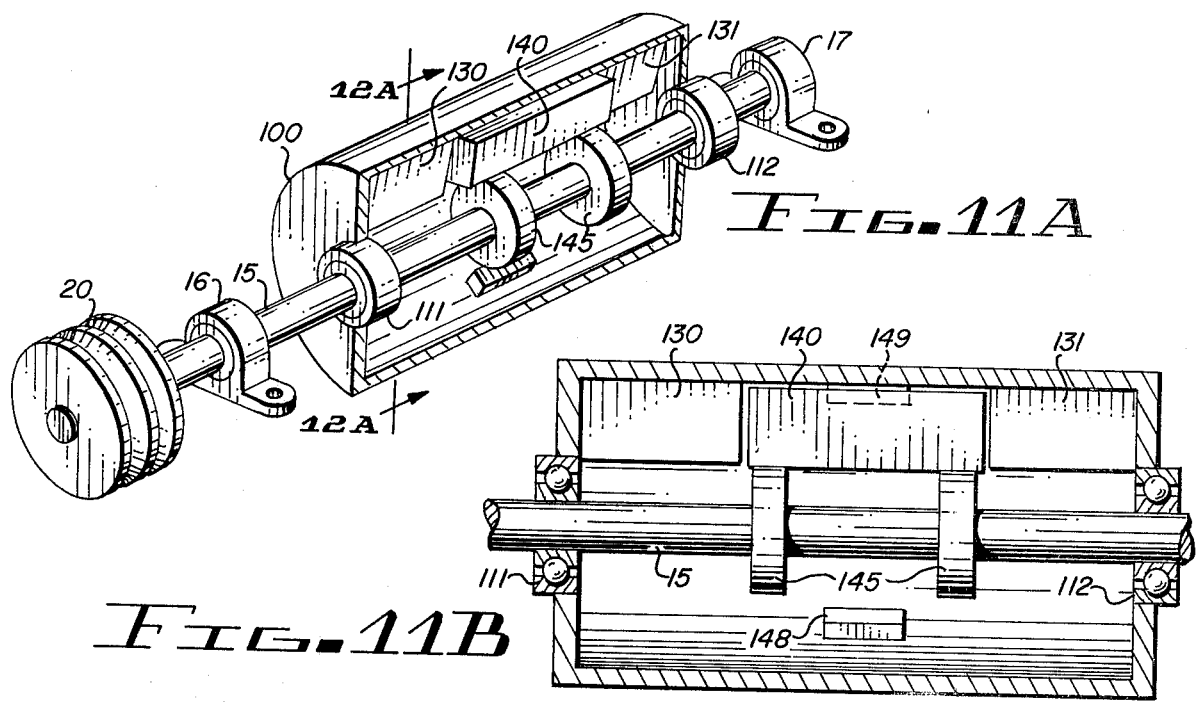
FIG.11A
FIG.11B
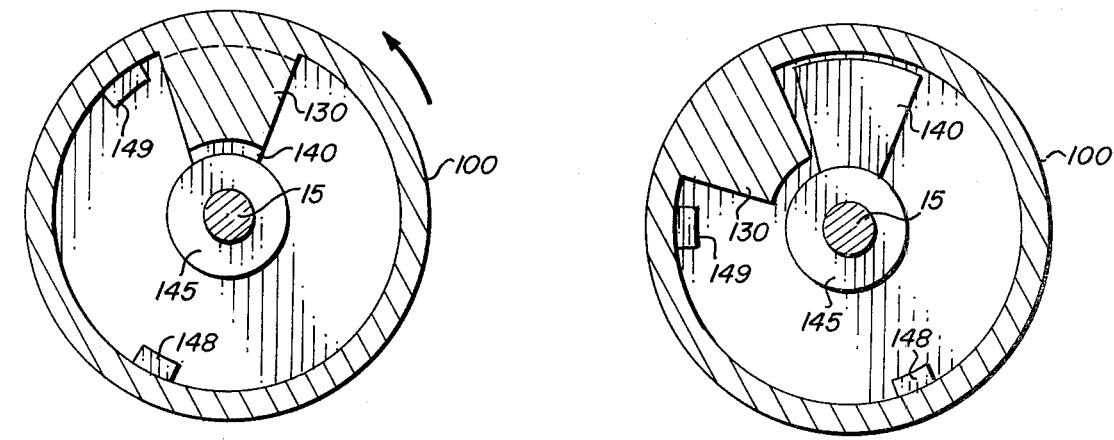
FIG.12A
FIG.12C
FIG.12B
FIG.12D

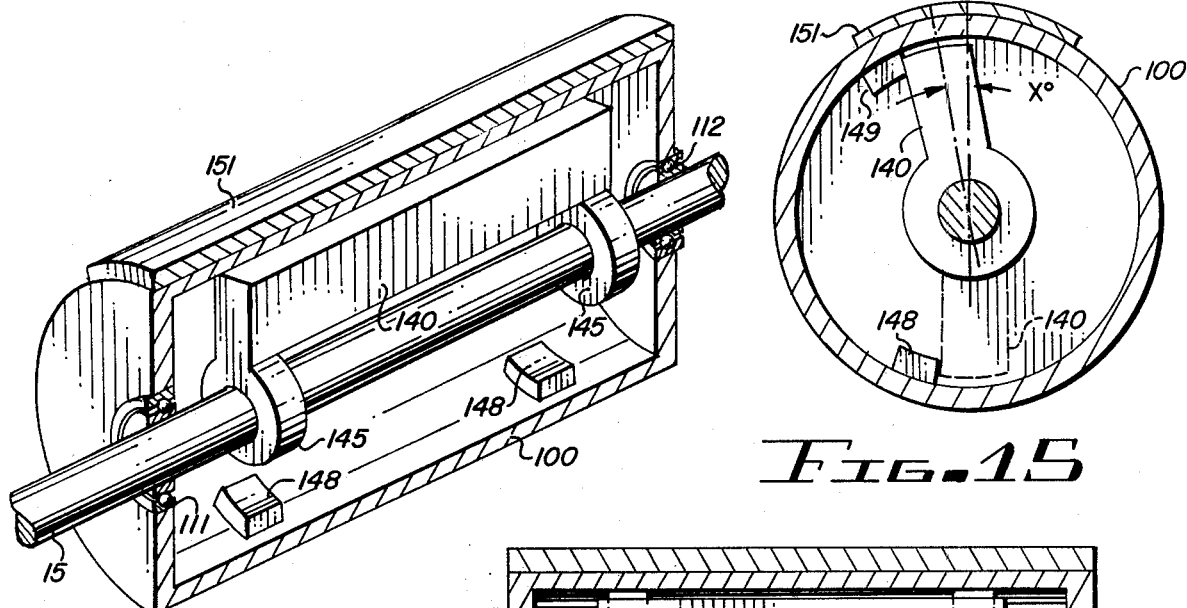
FIG. 13
FIG. 15
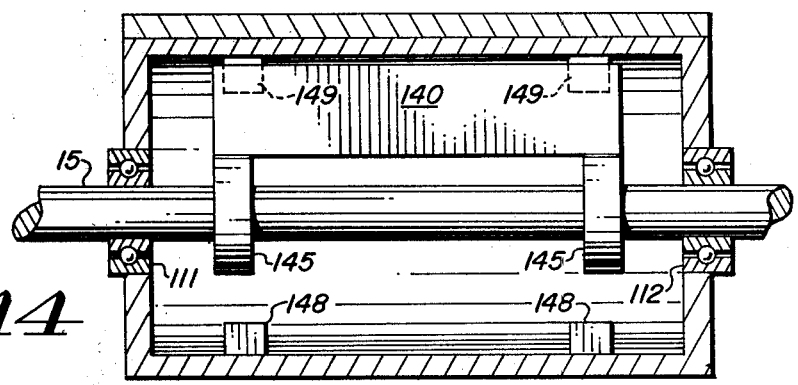
FIG. 14
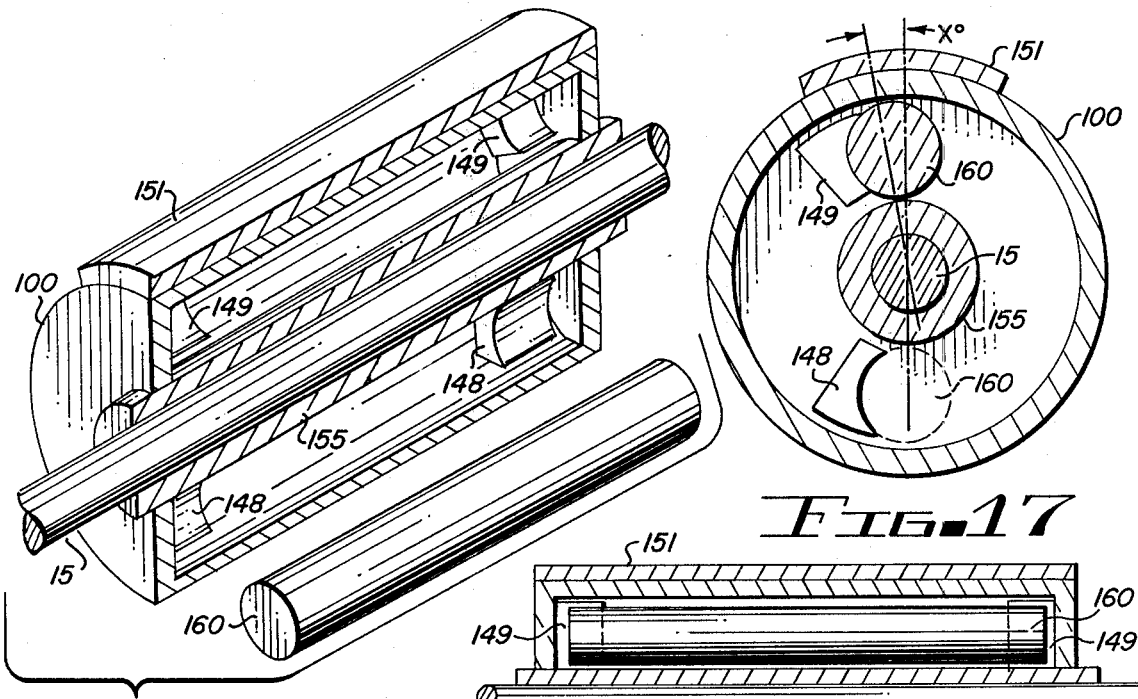
FIG. 17
FIG. 16
FIG. 18

VARIABLE MECHANICAL VIBRATOR

RELATED APPLICATIONS

This application is a continuation-in-part of application Ser. No. 797,933, filed May 18, 1977 now abandoned.

BACKGROUND OF THE INVENTION

Heavy-duty vibrators are used in a number of different applications, such as vibrating rollers for compacting soil and vibrators used on concrete block making machines. The vibrators on most machines of this type consist of a shaft or shafts which have relatively large eccentric weights attached to them to create an unbalanced condition. When these shafts are rotated at relatively high speeds, the desired vibration takes place. In concrete block making machines, the mass to be vibrated is substantial and the vibrator shaft is rotated by large electric motors (of five to ten horsepower). In addition, both in soil compactors and in vibrators for use in machines such as concrete block making machines, it is necessary to start and stop the vibrators frequently during operation. To effect the starting and stopping of such vibrators, it has been the practice in the past to use mechanical friction brakes or dynamic braking by applying electric current to special windings of the motors. Because relatively high rotational speeds are used for the vibrators, the stresses created by the braking and starting up again of the vibrator shaft are significant.

In the operation of machines for making concrete blocks, the vibrators must be started and stopped at up to ten times per minute. Also, it is necessary to bring the vibrator up to its operating speed and back to rest in as short a time period as possible. When the vibrator is used in soil compacting equipment, it is necessary to stop the vibrator each time the equipment stops and changes direction, and then to restart the vibrator and bring it up to speed in a very short time period once the equipment commences moving again.

The problems which result from the on/off cycling of heavy-duty vibrators are substantial. Large amounts of power are used to start the vibrator shafts and rotate all of the masses connected therewith, such as the pulleys, belts, brake drums and the like. Then, when the vibrator shaft rotation is stopped, large amounts of energy also must be used to prevent this mass from turning. As a result, massive heat build up takes place in the electric motors due to the constant starting and stopping operation and this heat build up substantially shortens the life of such motors. If mechanical brakes are used, there is a considerable heat build up in the use of the brakes and, of course, substantial wear and tear on the brake system itself. As a consequence, the periods between brake drum replacements are relatively short and the maintenance of the system is substantial. In addition, the constant starting and stopping of the heavy load creates a significant stress on all drive belts, couplings or gears which results in a shortened life and the necessity of using heavy-duty components throughout the system. Because of the constant power surging which results when the large electric motors are constantly started and stopped in the cycle of operation, power consumption is substantial and heavy-duty power lines and the like are necessary.

In concrete block making machines, the start-up and stopping times for operating the vibrator result in nonuniform block quality. This apparently is caused by horizontal vibration components which are present during transitional operating periods.

In addition, most heavy-duty vibrator systems are capable of providing only a fixed amount or amplitude of vibration for any given rotational speed of the vibrator shaft. If a different amplitude of vibration is desired, it has been necessary in the past to stop the system and change the weights or the relative locations of the weights on the vibrator shaft. After this has been accomplished, normal operation of the vibrator then once again can be resumed. Any time subsequently that a change in the vibration amplitude is desired, the cycle of stopping the system, readjusting the weights, and starting the system up again, must be repeated.

Attempts have been made in the past to provide a hydraulically variable vibrator system which does not require the stoppage of the vibrator shaft in order to change the vibration amplitude or to eliminate vibration of the shaft entirely. The hydraulic system utilizes a sealed tank mounted on the shaft and hydraulically movable weights are located in the tank. The positions of the weights can be adjusted with respect to one another to either be placed on diametrically opposite sides of the shaft (a balanced condition) or near one another in varying degrees to impart different amounts of amplitude vibration to the shaft due to the eccentric location of the composite weights. Such a hydraulic system, however, requires complex seals and controls to effect the desired adjustments and results in a relatively expensive system.

Accordingly, it is desirable to provide a mechanical variable vibrator in which the vibration amplitude can be changed from zero (a balanced condition) to some maximum amplitude of vibration and back again in a minimum period of time while the vibrator shaft is continuously running to avoid the necessity of starting and stopping the vibrator shaft.

SUMMARY OF THE INVENTION

Accordingly, it is an object of this invention to provide an improved vibrator system.

It is another object of this invention to provide an improved mechanical vibrator system.

It is an additional object of this invention to provide an improved variable mechanical vibrator system.

It is a further object of this invention to provide an improved mechanical vibrating system which can be changed from a balanced condition to an unbalanced condition while the vibrator shaft is continuously running.

In accordance with one preferred embodiment of this invention, a variable mechanical vibrator has a rotatably mounted shaft carrying a first set of eccentric weights on it for rotation with it. A second set of eccentric weights is rotatably mounted on the shaft and is movable between first and second rotational positions with respect to the first eccentric weights on the shaft. In the first position, the second eccentric weight set is diametrically oppositely aligned with respect to the first eccentric weight set, and the relative masses of the weights are selected so that in this position, the shaft is balanced. A mechanical control is provided for changing the rotational position of the second weight set with respect to the first weight set while the shaft is continuously rotating, so that the vibrator can be changed from a balanced condition (no vibration) to an unbalanced condition (vibration) and back again as desired, without stopping the shaft rotation.

A second preferred embodiment of the invention has a first weight carried on a shaft for rotation with the shaft. A second weight is rotatably mounted on the shaft; and the relative positions of the weights are changed by static and rotational inertia as the shaft is speeded up and slowed down. Abutments are provided to establish the balanced and unbalanced positions of the weights.

BRIEF DESCRIPTION OF THE DRAWINGS

FIGS. 11A and 11B are cut-away views of another embodiment of the invention;

FIGS. 12A to 12D illustrate different operating positions of the parts of the apparatus of FIGS. 11A and 11B;

FIGS. 13, 14 and 15 show another embodiment of the invention; and

FIGS. 16 to 18 show still another embodiment of the invention.

DETAILED DESCRIPTION OF THE PREFERRED EMBODIMENT

Figure 1:
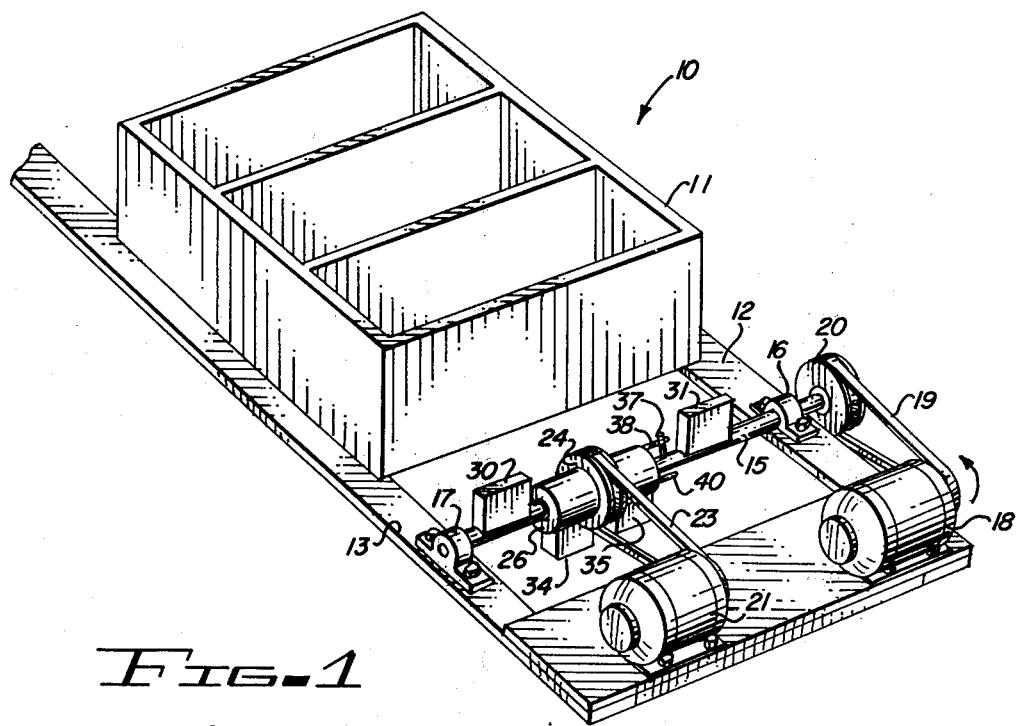
FIG. 1 is a diagrammatic perspective view of a preferred embodiment of the invention mounted on a concrete block making machine.

Referring now to the drawings, like reference numbers are used throughout the several figures to designate the same or similar components. The apparatus shown in all of these figures is directed to a continuously adjustable vibrator apparatus which may be used with vibrating rollers, vibrating plates, vibrating frames or the like, in all of which the amplitude of vibration is adjusted by changing the imbalance of angular offset weights mounted on a rotating shaft.

Referring now to FIG. 1, there is shown depicted in a very general manner, a concrete block making machine 10 including a three-sectioned concrete block making mold portion 11 mounted on a pair of parallel longitudinally extending frame members 12 and 13. The frame members 12 and 13 are in turn supported by springs or other resilient support members (not shown) to permit the frame members 12 and 13 and the molds 11 carried on them to be vibrated in the making of concrete blocks. Machines operating in this manner are conventional and for that reason, no details of the concrete block making machine have been shown. In order to induce vibrations into the frame members 12 and 13, a vibrator shaft 15 is rotatably mounted in end support bearings 16 and 17 which are attached to the frame members 12 and 13, respectively. During operation of the machine, the shaft 15 is continuously rotated by an electric motor 18 through a drive belt 19 which turns a drive pulley 20 attached to the right-hand end of the shaft as the apparatus is viewed in FIG. 1. The rotation of the shaft 15 is in the direction of the arrow shown in FIG. 1.

In the operation of concrete block making machines, it is necessary to vibrate the molds 11 for a short period of time to compact the concrete into the molds. Then the vibration must be terminated to permit removal of the molded blocks from the machine and the introduction of new concrete into the molds. Following this, vibration is resumed for the next set of blocks to be produced by the machine. This cycle is repeated several times a minute, as much as ten times per minute for some machines.

Because of the large mass of the machine and the weight of the blocks to be vibrated, the vibrating mechanism, including the vibrating shaft 15, necessarily requires heavy eccentric weights rotating at a relatively high velocity in order to induce the required amount of vibration to the machine. If only a single set of eccentric weights is mounted on the shaft 15, it is necessary to start and stop the shaft rotation for each of these cycles; and this has been the procedure followed in the past. Because of the substantial wear and tear on the vibrating mechanism and the high energy consumption and shortened life of the electric motors, the apparatus shown in FIG. 1 rotates the shaft 15 continuously so that the motor 18, once it is turned on and running, runs continuously throughout the cycles of operation of the vibration mechanism. Starting and stopping of the vibration is accomplished under the control of a second electric motor 21 which is turned on and off for each cycle of operation of the vibrator or which has its drive belt 23 clutched on and off for each cycle. The drive belt 23 is used to drive a pulley 24 which is secured to a sleeve 26 mounted for free rotation on the shaft 15 on suitable bearings 27 (illustrated in FIGS. 3 and 4).

Control of the vibration of the shaft 15 is effected by two sets of eccentric weights. One set of these weights comprises the weights 30 and 31 attached to the shaft 15 and aligned with one another. These weights alone cause the shaft 15 to be substantially out of balance, as is readily apparent from an examination of FIGS. 1 and 2. A second set of weights 34 and 35 are eccentrically mounted and aligned with one another on the sleeve 26. The weights 34 and 35 have a mass which is selected to equal the mass of the weights 30 and 31; so that when the weights are in the position shown in FIGS. 1 and 2, that is, when the sets 30/31 and 34/35 are diametrically opposed to one another, the masses offset one another and the shaft 15 is balanced. This means that when all of the weights 30, 31, 34 and 35 are rotating together, no vibration is imparted to the shaft 15; and therefore, no vibration is imparted to the frame support members 12 and 13 of the concrete block making machine.

This condition of operation, namely the vibration-free condition, is effected when the shaft 15 is driven by the motor 18 through the pulley 20 while the motor 21 is turned off or does not impart a driving rotational force to the pulley 24. In this mode of operation, a pin 37, which is keyed to the shaft 15 (see FIG. 3) and extends radially outwardly from the shaft 15, engages an axially extending pin 38 which is keyed to the sleeve 26 (see FIGS. 2 and 3). Thus, the shaft 15 is used to turn the sleeve 26 with it and therefore, the weights 34 and 35, through the engagement of the pins 37 and 38, as illustrated in FIG. 2.

Now if vibration of the concrete block making machine 10 is desired, the motor 21 is turned on or its clutch is engaged to impart a driving force to the pulley 24. At the same time, the motor 18 may be turned off if desired, or the motor 18 may be permitted to continuously run. If the latter mode of operation is selected, the speed with which the motor 21 turns the pulley 24 is selected to be greater than the speed at which the motor 18 rotates the shaft 15. This then causes the pulley 24 to rotate the sleeve 26 in the same direction of rotation of the shaft 15 but at a greater rate until the pin 40 on the sleeve 26 rotates in the direction of the arrow shown in FIG. 3 to engage the pin 37 on the shaft 15 on its left-hand side, as viewed in FIG. 3. Once the pin 40 engages the pin 37, the pulley 24 is driven by the motor 21, then rotates the entire assembly, including the shaft 15 at a greater rate of speed as determined by the motor 21. The motor 21 also could be run continuously, but at a slightly lower speed than the motor 18. Then when operating of the system in its vibrating mode is desired, the speed at which the motor 21 drives the pulley 24 may be increased by any suitable means to rotate the sleeve 26 relative to the shaft 15 in the same manner described above. By permitting the motor 18 (or the motors 18 and 21) to continuously operate in this manner, the forces created when the pin 40 hits the pin 37 are minimized, thereby minimizing the shock to the system when it is changed from its nonvibrating mode to its vibrating mode. An examination of FIGS. 1 and 2 shows that when the pin 40 is driving the pin 37, the weights 34 and 35 are aligned with the weights 30 and 31, imparting a substantial imbalance of the total mass rotating on the shaft 15. This results in the desired vibration of the concrete block making machine 10.

When a return to the nonvibrating mode of operation is desired, the motor 21 is turned off or is declutched (or its speed is reduced if it continuously operates) to permit the rotation of the shaft 15 once again to be controlled by the motor 18. When this happens, the pin 37 returns to the position shown in FIGS. 1, 2 and 3 to drive the sleeve 26 in the position shown in FIGS. 1 and 2, and the vibrations cease. The foregoing cycle of operation from nonvibration to vibration back to a nonvibration mode may be continuously repeated. The amplitude of vibration in the vibration mode may be varied from a maximum with the pin 40 in the position shown in FIG. 3 to various intermediate amplitudes by locating the pin 40 in different ones of the holes in the end of the sleeve 26 as shown most clearly in FIG. 3. Since the motor 18 is permitted to continuously run, and has no other function but to keep the balanced system rotating, it may be a much smaller motor than the ones normally employed in the vibrators for concrete block making machines. Also, since the motor 21 does not need to start and stop the entire mass of weights which is rotated on the shaft 15, this motor may be a smaller motor than previously has been employed in such machines.

Figure 2:
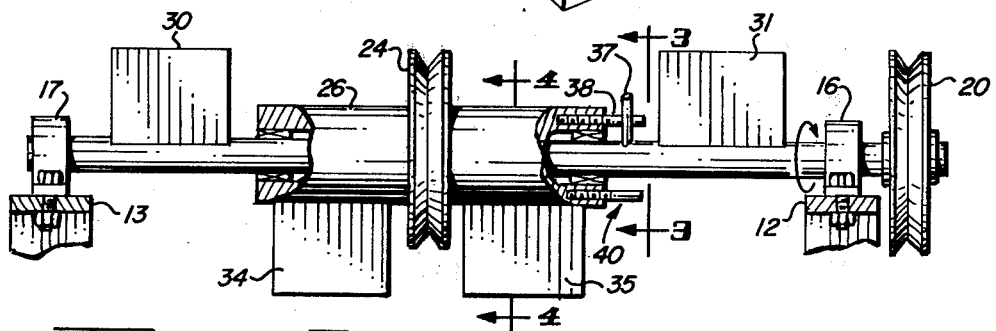
FIG. 2 shows details of the vibrator mechanism of the apparatus shown in FIG. 1.
Figure 3:
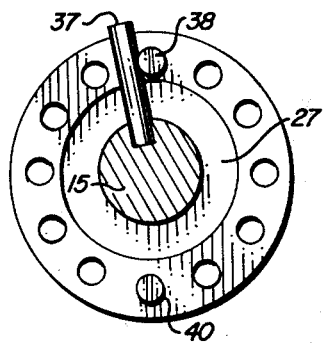
FIGS. 3 and 4 show details of the mechanism of FIG. 2.
Figure 4:
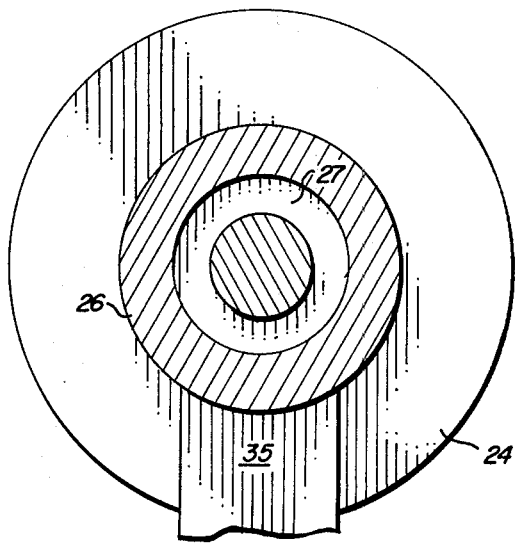
Figure 5:
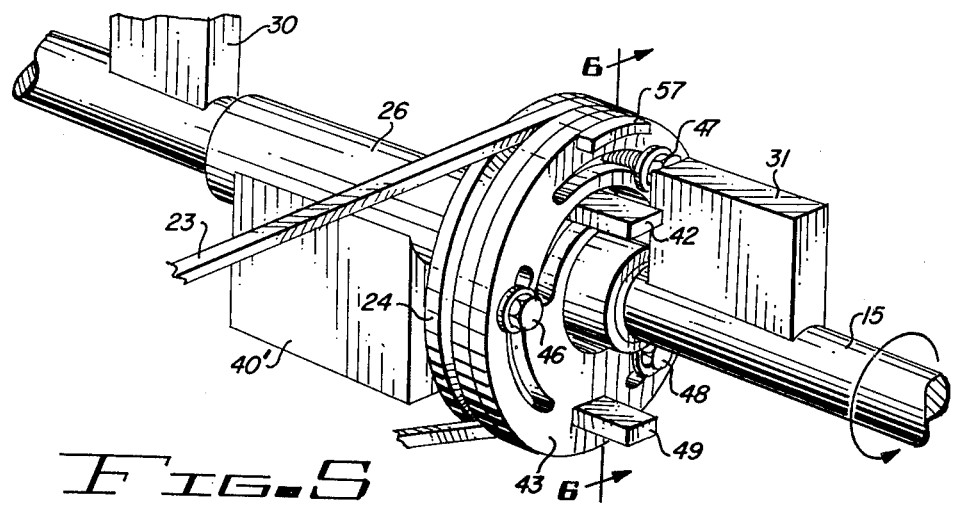
FIG. 5 shows another embodiment of the invention.

Reference now should be made to FIG. 5 which illustrates an alternative form of apparatus carried on the sleeve 26 for replacing the pins 38 and 40 shown in FIGS. 1, 2 and 3 on the sleeve 26, while also permitting elimination of the pin 37 illustrated in the embodiments of FIGS. 1 and 2.

In the embodiment shown in FIG. 5, the weights 34 and 35 have been combined together into a single weight 40' attached to the sleeve 26. The function of the weight 40' is the same as performed by the two weights 34 and 35. In the structure of FIG. 5, however, since a single weight 40' is used, the pulley 24 is shown mounted to the right-hand end of the sleeve 26. Also, for the purpose of more clearly showing the variation of the structure of FIG. 5, the shaft 15 is illustrated as turning in a counterclockwise direction, as viewed from the right-hand end of FIG. 5, instead of from the clockwise direction used in FIG. 1. The operation, however, of the apparatus in FIG. 5 is otherwise the same as shown in FIG. 1. The weight 31, however, is mounted closer to the right-hand end of the sleeve 26; so that the left-hand end of the weight 31 (as viewed in FIG. 5) is in the same position occupied by the pin 37 of the embodiment shown in FIGS. 1 and 2.

The pins 38 and 40 of the embodiment of FIGS. 1 and 2 have been replaced with first and second axially extending abutments 42 and 49. The abutment 42 is formed as an integral part of the pulley 24 (as most clearly shown in FIG. 6). Then, an axially rotatable plate 43 is fastened to the right-hand side of the pulley 24 (as viewed in FIGS. 5 and 6) by means of three bolts 46, 47 and 48. The plate 43 carries the second abutment 49 on it for rotation with the plate.

The angular displacement of the abutment 49 from the abutment 42 is set or adjusted by loosening the bolts 46, 47 and 48 and turning the plate 43 in either direction in the slots 50, 51 and 52 until the desired location of the abutment 49 is reached. A slot 55 is used to accommodate the abutment 42 during this rotational adjustment of the plate 43 with respect to the abutment 42. To prevent the rotational adjustment of the abutment 49 from imparting an undesired amount of imbalance to the sleeve 26, a compensating weight 57 is placed on the plate 43 diametrically opposed to the abutment 49. The weight 57 has a mass which is the same as the mass of the abutment 49. A similar compensation weight 59 is formed as part of the pulley 24 to offset the eccentric or unbalancing weight of the abutment 42 on the pulley 24. This compensating weight 59 is shown most clearly in FIG. 6.

Figure 6:
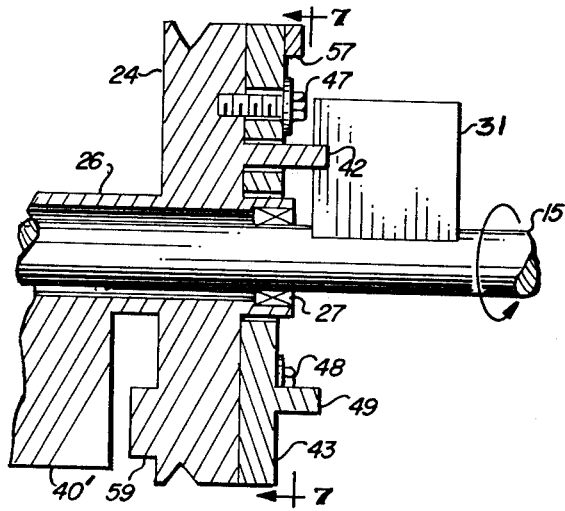
FIGS. 6 and 7 show details of the embodiment shown in FIG. 5.
Figure 7:
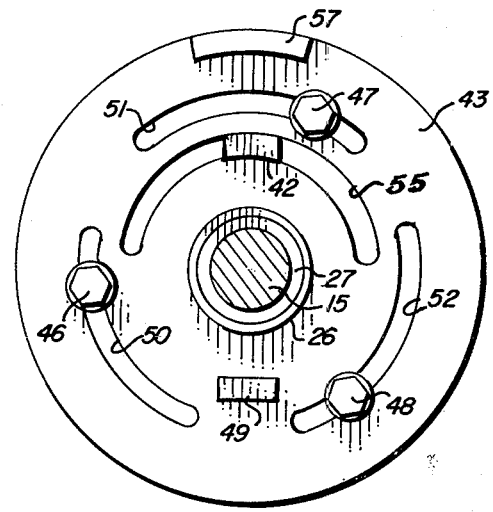

The location of the abutment 42 is selected to cause the assembly to be in its balanced position when the weight 31 engages the edge of the abutment 42 to cause the sleeve 26 to be driven by the shaft 15, as illustrated in FIGS. 5 and 6. The adjustable abutment 49 is selected so that varying amounts of imbalance can be imparted to the shaft 15 to adjust the amplitude of vibration imparted to the shaft when the pulley 24 is used to drive the shaft 15 through the sleeve 26, and thereby cause the abutment 49 to engage the back side of the weight 31 (as illustrated in FIG. 5). The adjustment of the axial location of the abutment 49 with respect to the location of the abutment 42 can be such as to cause the weights 30, 31 and 40' to be axially aligned with one another in the unbalanced condition, thereby imparting maximum vibration, or to cause the weight 40' to be located at some other axial relationship to impart a lesser amount of vibration to the shaft 15 when the sleeve 26 drives the shaft 15.

Figure 8:
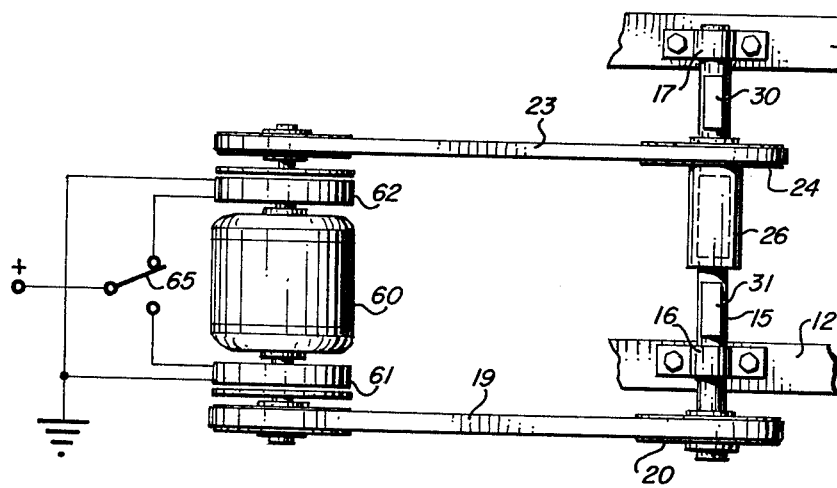
FIG. 8 shows a variation of the arrangement illustrated in FIG. 1.

In the embodiments which have been described thus far, two drive motors 18 and 21 have been indicated. It is not necessary, however, to use two drive motors. In FIG. 8, a single drive motor is shown for driving the belts 19 and 23. The belts in turn are coupled to the shaft of the motor through a pair of electric clutches 61 and 62, respectively; and one or the other of the belts 19 or 23 is rotated by the motor 60 at any given time. Control of which one of the drive belts 19 or 23 is used to operate the vibrator system is effected by means of a switch 65 which is a single-pole, double-throw switch to energize one or the other of the clutches 61 or 62 at a time. As shown in FIG. 8, the switch is energizing the clutch 62; so that the vibrator is in its vibrating mode, driving the pulley 24 on the sleeve 26. When the switch 65 is placed in its lowermost position as shown in FIG. 8, the clutch 62 is disengaged and the clutch 61 is engaged to cause the pulley 20 to drive the shaft 15 thereby placing the vibrator in its nonvibrating mode of operation. Operation of the switch 65 may be manual or automatically controlled in accordance with the cycle of operation of the apparatus with which the vibrator is used.

Figure 9:
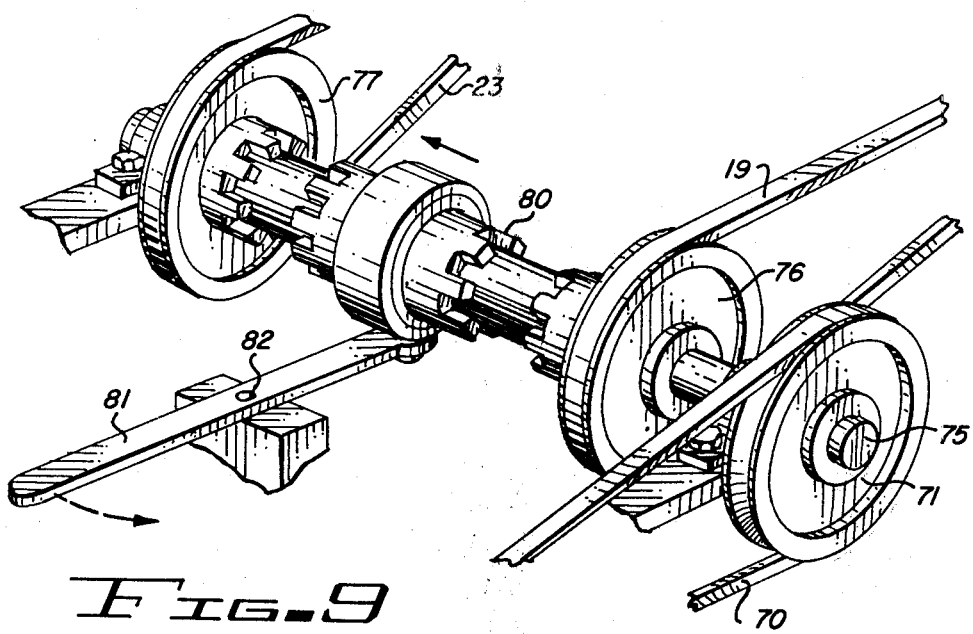
FIG. 9 shows another variation of the arrangement which may be substituted for the one shown in FIG. 1.

Another variation for utilizing a single motor to drive the belts 19 and 23 is illustrated in FIG. 9. In the apparatus of FIG. 9, a drive motor (not shown) rotates a pulley belt 70 to drive pulley 71 attached to a shaft 75 which has a pair of pulleys 76 and 77 mounted on it through suitable bearings for free rotation about the shaft 75. The pulley 76 is used to drive the belt 19 and the pulley 77 is used to drive the belt 23. The central portion of the shaft 75 has a splined clutch 80 mounted on it, and an operating lever 81 may be pivoted in either direction about a pivot point 82 to engage the clutch 80 with one or the other of the pulleys 76 and 77 to cause the engaged pulley to rotate with the rotation of the shaft 75. Thus, one or the other of the belts 19 or 23 is driven at any given time in accordance with whichever one of the pulleys 76 and 77 is engaged by the clutch 80. This apparatus functions in the same manner as the apparatus illustrated in FIG. 8.

Figure 10:
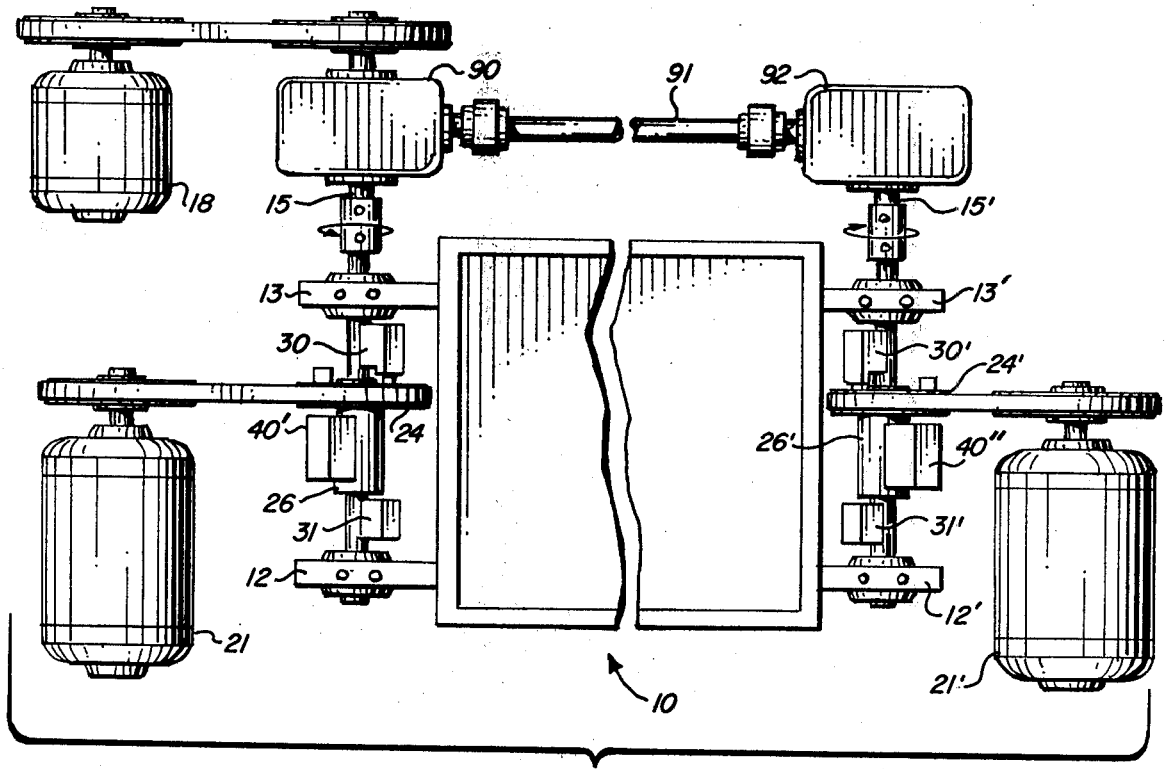
FIG. 10 shows a variation of the mechanism shown in FIG. 1.

FIG. 10 illustrates a concrete block making machine 10 which has a pair of assemblies of the type shown in FIG. 1 (or in accordance with the other embodiments shown in FIGS. 5, 8 and 9) used to control the vibration of the concrete block making machine at both ends of the frame members 12 and 13. The motor 18 is used to drive the shaft of a first gearbox 90, one output of which is used to rotate the shaft 15 and the other output of which is supplied by way of a shaft 91 to a second gearbox 92 to rotate a second shaft 15' of a second vibrator assembly in synchronism with the rotation of the shaft 15. The shafts 15 and 15' of the two vibrator assemblies are rotated in opposite directions as indicated by the arrows in FIG. 10. The shafts 15 and 15' are initially started with the weights 30 and 31 on the shaft 15 located in the same relative angular position as the weights 30' and 31' on the shaft 15'.

All operation of the system is synchronized, and the motors 21 and 21', used to rotate the central pulleys 24 and 24' on the sleeves 26 and 26', are operated in synchronism with one another in accordance with the techniques used in the embodiments which have been described previously. By synchronizing the rotation of the shafts 15 and 15', the vibration of the concrete block machine 10 is substantially restricted to a vertical vibration with the horizontal components being offset by the counter-rotation of the two shafts 15 and 15'. This technique using two vibrator shafts, is presently employed on concrete block making machines, and FIG. 10 illustrates the manner in which the vibrator apparatus of this invention also can be employed in such a machine.

Reference now should be made to FIGS. 11A, 11B and 12A through 12D illustrating another embodiment of the invention which may be used in place of the embodiments described previously. The embodiment shown in FIGS. 11A through 12D differs from those described previously since only a single drive motor, such as the drive motor 18, is required for the machine shown in FIG. 1 or at each end of the frame members 12 and 13 of a concrete block making machine as illustrated in FIG. 10. In the embodiment shown in FIGS. 11A through 12D, rotational inertia is utilized to effect the shifting of first and second weights relative to a rotating shaft to achieve the balancing and unbalancing of the total rotating weight mass to change the mode of operation of the machine from a nonvibrating mode to a vibrating mode and vice-versa.

As described previously, the vibrator shaft 15 is mounted on a pair of end support bearings or pillow blocks 16 and 17; and this shaft is rotated under control of a drive belt attached to a motor (not shown) used to drive the pulley 20 on the end of the shaft. A hollow drum 100 is mounted for free rotation on the shaft 15 on a pair of bearings 111 and 112. Attached to the inner surface of the drum 100 and adjacent each end are a pair of weights 130 and 131. These weights are permanently attached to and rotate with the drum 100, causing the drum to be grossly unbalanced.

Inside the drum 100, a second weight 140 is secured to the shaft 15 on a pair of disc-shaped support members 145 and this second weight rotates with the shaft 15. The mass of the weight 140 is chosen to equal the mass or weight of the two weights 130 and 131. As shown most clearly in FIGS. 12A through 12D, a pair of stops 148 and 149 are attached to the inner surface of the drum 100 to limit the relative angular rotation which is attainable between the shaft 15 and the drum 100 since these stops 148 and 149 are located to abut against opposite sides of the weight 140.

Referring now to FIGS. 12A and 12B, assume that the system shown in FIGS. 11A and 11B is at rest and the shaft 15 is rotated in a counterclockwise direction, as viewed in FIGS. 12A and 12B, to start up the operation of the vibrator. When this occurs, the weight 140 moves from some intermediate position to a position between the weights 130 and 131 where it engages the abutment 149, as illustrated in FIG. 12B. This causes the cylinder 100 and the shaft 15 to rotate as a unit, and the shaft 15 continuously drives the cylinder 100 through the weight 140 and the abutment 149 so long as continuous driving power is applied to the pulley wheel 20 by the drive motor (not shown). In this position of the weights 130, 131 and 140, the unit is grossly unbalanced and imparts the desired vibration to the shaft 15. In FIG. 12B, it can be seen that the location of the abutment 149 causes the weight 140 to move past the centerline location of the weights 130 and 131 by a small angle of X degrees (typically 5 or 10 degrees). This is done to insure that a positive drive connection is effected throughout the rotation of the unit, since it has been discovered that if the weights 130, 131 and 140 are perfectly aligned, there may be some chattering or bouncing of the weight 140 against the stop 149.

When power is removed from the motor driving the pulley wheel 20, the shaft 15 slows down. It is not necessary to apply braking force to the shaft 15, but merely to remove the driving power from the motor. When this occurs the rotational inertia of the drum 100 and the weights 130 and 131 causes the drum 100 to continue its rotation at the previous speed of rotation of the shaft 15. Thus, the drum 100 rotates counterclockwise, as shown in FIGS. 12C and 12D, relative to the shaft 15 and the weight 140 until the opposite side of the weight 140 is engaged by the stop 148. In this position, the center of the weight 140 is located directly opposite the centers of the weights 130 and 131, as shown in FIG. 12D. Since the weight of the weight 140 is equal to the combined weight of the weights 130 and 131, the unit is now balanced; and no vibration is imparted to the shaft 15. The rotational inertia of the combined unit is sufficient to maintain the relative positions of the parts shown in FIG. 12D as the rotating unit gradually loses its rotational speed.

In the actual operation of the unit in a concrete block making machine or the like, the rotational speed of the unit, when it is operating in the position shown in FIG. 12D, is not allowed to drop to zero; but it merely drops somewhat from the maximum speed attained by the shaft 15 when it is being driven by the drive motor. When a new vibration cycle of operation of the concrete block making machine is desired, power is restored to the drive motor, which in turn again increases the speed of the rotation of the shaft 15; so that the weight 140 once again is moved by the shaft 15 in a counterclockwise direction relative to the drum 100. The weight 140 then moves from the position shown in FIG. 12D, through the position shown in FIG. 12A to the position shown in FIG. 12B relative to the weights 130 and 131. The shaft 15 then again commences to drive the drum 100, through the weight 140, and the unbalanced or vibration position of the weights 130, 131 and 140 is re-established.

The angular displacement of "X" degrees shown in FIG. 12B prevents the vibratory force of the unit from parting the weight 140 from the weights 130 and 131 and throwing the unit into a balanced state prematurely. In actual use, a unit constructed in accordance with the structure of FIGS. 11A through 12D was driven in a concrete block making machine by an 1800 RPM motor. This motor was cycled on and off to shift the unit back and forth between its vibration and nonvibration modes of operation. During the nonvibration portions of the cycle of operation of the machine, the motor (and therefore the shaft 15) lost only 300 RPMs during the time it was turned off and the unit was coasting under the rotational inertia imparted to it through the drum 100. As a consequence, significantly less power is consumed by the turning on and off of the drive motor, no brakes are required, and nearly instantaneous shifting of the vibration unit from its vibration mode of operation to its balanced (nonvibration) mode of operation is attained.

FIGS. 13, 14 and 15 illustrate another variation of the embodiment of FIGS. 11A through 12D. The apparatus of FIGS. 13, 14 and 15 operates in the same manner as the apparatus of FIGS. 11A and 11B to utilize the static and rotational inertia of the weights to control the relative positions of the unit between its unbalanced (vibrational) and balanced (nonvibrational) modes of operation. In the embodiment of FIGS. 13 through 15, however, the weights 130 and 131 of FIGS. 11A and 11B have been replaced by an external weight 151 attached to the outside of the drum 100. Stops 148 and 149 are still provided on the inside of the drum to control the two relative positions of the weight 140 within the drum 100. The weight 140 abuts against either the stop 149 or the stop 148 in the same manner described previously in conjunction with the apparatus shown in FIGS. 11A through 12D. The apparatus of FIGS. 13, 14 and 15 utilizes the static and rotational inertia of the weights attached to the shaft 15 and to the drum 100 to shift the operation of the unit between its vibrational and nonvibrational modes of operation in the same manner as the embodiment shown in FIGS. 11A through 12D.

FIGS. 16, 17 and 18 illustrate yet another embodiment of the invention which utilizes the static and rotational inertia of weights to shift the operation of the unit between vibrational and nonvibrational modes of operation. In the embodiment shown in FIGS. 16 through 18, however, the drum 100 is secured to the shaft 15 by a sleeve 155 to always rotate with the shaft 15. The drum 100 carries an unbalancing weight 151 on its external surface. An internal channel is formed between the inner sleeve 155 and the inner surface of the drum 100, and a cylindrical weight 160 is free to rotate within this channel. A pair of stops 148 and 149 are provided on the inner surface of the drum; but these stops have a curved surface for accommodating the abutting against the cylindrical weight 160. In contrast to the embodiments shown in FIGS. 11A through 15, the apparatus of FIGS. 16 and 17 is illustrated as rotating in a clockwise direction rather than a counterclockwise direction. The actual direction of the rotation of any of these embodiments is not significant except the stops 148 and 149 need to be positioned in accordance with the direction of rotation which is pre-established for the machine.

When the apparatus of FIGS. 16, 17 and 18 is driven by a motor (not shown) to apply rotational power in the clockwise direction (as viewed in FIG. 17) to the shaft 15, the drum 100, which is fixed to the shaft 15 in the embodiment shown in FIGS. 16 to 18 rotates with the shaft. This causes the block 149 to catch and engage the weight 160, placing the unit in its unbalanced or vibrational mode of operation. The offset of "X" degrees between the center of the weight 160 and the center of the weight 151 is maintained in this unbalanced mode of operation for the same reasons given above in the discussion of the embodiments shown in FIGS. 11 and 13.

When the power is removed from the motor driving the shaft 15, the shaft 15 and the drum 100 (which in this embodiment is attached to the shaft 15 through the sleeve 155) tends to slow down. The weight 160, however, continues to rotate at its previous rotational speed within the channel formed between the sleeve 155 and the interior surface of the drum 100 until it abuts against the stop 148. This position is shown in dotted lines in FIG. 17. In this latter position, the weight 160 is diametrically opposite and counterbalances the weight 151. As in the other embodiments, the weight 160 is chosen to have a mass or weight which is equal to the mass or weight of the weight 151 attached to the outside of the drum 100. When the weight 160 is in the dotted line position shown in FIG. 17, the unit is balanced; and vibration of the shaft 15 ceases. When power once again is applied to the motor driving the shaft 15, the increase in the speed of rotation of the shaft 15 relative to the weight 160 causes the shaft and drum 100 to rotate clockwise away from the weight 160 until the stop 149 engages the weight 160 in the solid line position shown in FIG. 17. In this position the vibrational mode of operation of the unit is re-established. It has been found that, because of the lower total mass being shifted in the embodiment of FIG. 16, best results are obtained by abruptly starting up or slowing down the shaft 15 to ensure the weight 160 moves to the desired positions.

The stops 148 and 149 are provided with curved surfaces where they engage the weight 160 to obtain maximum contact surface with the weight 160. It also may be desirable to place a small amount of oil or other suitable lubricant in the interior of the drum 100 of the apparatus shown in FIGS. 16 through 18 to minimize wear and cushion the impact of the cylindrical weight 160 against the stops 148 and 149.

In order to reduce the noise of impact between the stops 148 and 149 and the weight 140 of the embodiments shown in FIGS. 11A through 15, or the weight 160 of the embodiment shown in FIGS. 16, 17 and 18, it also may be desirable to cover the surfaces of the stops 148 and 149 with a resilient cushioning material, such as hard rubber, nylon or the like. This then reduces the overall noise produced by the machine as it is changed from its vibrational mode of operation to a nonvibrational mode by cyclically applying power and removing power from the motor driving the shaft 15.

The various embodiments of this invention, which have been described above in conjunction with the different figures of the drawings, permit a rapid transition between the vibrational mode and the nonvibrational mode of the machine on which they are used. When vibrators are used on a concrete blocking making machine, it has been found that a more uniform quality of block is produced. It is believed that this result is attained because of the fairly short transitional time required to turn the vibration on and off. As a consequence, there is very little horizontal component of vibration imparted to the mold box of the concrete block making machine when vibrators of this type are used on opposite sides of such a machine, as illustrated in FIG. 10. This better uniformity of blocks produced by concrete block making machines has been observed in machines which have been modified only by replacing the conventional vibrators with vibrators made in accordance with one of the embodiments of the invention which has been described above. No other changes were made to the machine.

The foregoing descriptions of various embodiments of the invention are to be considered as illustrative only, and various modifications to the invention will occur to those skilled in the art without departing from the scope of the invention defined in the following claims.

I claim:

1. A variable vibrator including in combination:
   a rotatably mounted shaft;
   first eccentric weight means on said shaft for rotation therewith;
   a cylindrical drum mounted on said shaft for free rotation with respect thereto;
   second eccentric weight means attached to said drum;
   first and second stop means attached to the internal surface of said drum for engagement by opposite sides of said first eccentric weight means, said first stop located to cause a first side of said first weight means to engage said first stop when driving power is applied to said rotatably mounted shaft to rotate the same, thereby causing said first weight to rotate said drum through force applied to said first stop, said first stop being located to cause said first eccentric weight means to have a center of gravity on the same side of said shaft but a predetermined number of degrees ahead of the center of gravity of said second weight means in the direction of rotation of said shaft when said first weight means engages said first stop; and
   reducing the speed of driving power to said shaft resulting in rotational inertia rotating said drum relative to said shaft to cause the second stop carried by said drum to engage the opposite side of said first weight means with said first and second weight means located on opposite sides of said shaft.

2. The combination according to claim 1 wherein said first and second eccentric weight means are selected to have substantially the same vibratory mass, and engagement of said first stop by said first weight means places said first and second weight means on the same side of said shaft and engagement of said second stop by said first weight means causes said first and second weight means to be on diametrically opposite sides of said shaft.

3. A rotating vibrator including in combination:
   a rotatably mounted shaft;
   first eccentric weight means on said shaft for rotation therewith;
   a rotational mass including a second eccentric weight means disposed about the axis of said shaft and mounted for free concentric rotation about said shaft;
   driving means coupled with at least one of said shaft and said rotational mass for changing the rotational speed of said vibrator, whereby the other of said shaft and said rotational mass comprises an inertia mass;
   stop means attached to one of said shaft and said rotational mass for limiting the relative rotation of said shaft and said rotational mass between first and second relative rotational positions; and
   engagement means coupled with the other of said shaft and said rotational mass for engaging said stop means in said first and second relative rotational positions; such that in said first relative rotational position, said first and second weight means are located on diametrically opposite sides of said shaft to balance the vibrator when said driving means is decelerating, and in said second relative rotational position said first and second weight means are located on the same side of said shaft to unbalance the vibrator, with said stop means located so that said first and second weight means are locked into said second position solely by means of forces caused by rotation when said driving means is increasing or maintaining constant the rotational speed of said vibrator.

4. The combination according to claim 3 wherein said means for changing the rotational speed of said vibrator device is coupled with said shaft and said rotational mass is rotatably mounted on said shaft.

5. The combination according to claim 3 wherein said stop means comprises first and second stops for establishing said first and second relative rotational positions, respectively; and said means for changing the rotational speed of said vibrator comprises a drive means for increasing and decreasing the speed of said one of said shaft and said rotational mass to which it is coupled, wherein the inertia of said other of said shaft and said rotational mass resists such increases and decreases in speed and thereby rotates relative to said one of said shaft and said rotational mass to cause said engagement means to engage a different one of said first and second stops from the stop engaged prior to such increases and decreases in speed.

6. The combination according to claim 5 wherein said drive means is coupled with said shaft, said rotational mass is rotatably mounted on said shaft, and said engaging means comprises at least one protrusion for engaging said first and second stops.

7. A variable vibrator including in combination:
   a rotatably mounted shaft;

first eccentric weight means carried by a hollow drum fixedly attached to said shaft and having a channel therein with first and second stops located in said channel;

second eccentric weight means comprising a cylindrically shaped weight located within said channel for free movement therein between a first rotational position, with said first and second weight means being diametrically oppositely aligned with respect to said shaft, and a second rotational position different from said first rotational position as determined by the location of said first and second stops, said second rotational position being such that the center of gravity of said first weight means is a predetermined number of degrees ahead of the center of gravity of said second weight means in such position in the direction of rotation of said shaft when a constant rotational speed is reached and maintained by said drum and shaft; and means for abruptly effecting changes in the relative speeds of rotation of said first and second weight means while said shaft is continuously rotating to effect changes in the relative rotational positions of said first and second eccentric weight means between said first rotational position and said second rotational position.

8. The combination according to claim 7 wherein said predetermined number of degrees is 5 to 10 degrees.

9. A rotating vibrator including in combination;

a rotatably mounted shaft;

first eccentric weight means on said shaft for rotation therewith;

a rotational mass including a second eccentric weight means disposed about the axis of said shaft and mounted for free concentric rotation about said shaft, said second eccentric weight means having the same vibratory mass as said first eccentric weight means;

means coupled with at least one of said shaft and said rotational mass for changing the rotational speed of said vibrator, whereby the other of said shaft and said rotational mass comprises an inertia mass;

stop means attached to one of said shaft and said rotational mass for limiting the relative rotation of said shaft and said rotational mass between first and second relative rotational positions; and engagement means coupled with the other of said shaft and said rotational mass for engaging said stop means in said first and second relative rotational positions, such that in said first relative rotational position said first and second weight means are located on diametrically opposite sides of said shaft to balance the vibrator, and in said second relative rotational position said first and second weight means are located on the same side of said shaft to unbalance the vibrator, with the one of said first and second weight means which when driven tends to rotate faster than the other of said weight means being located relative to said stop means such that in said second rotational position said one weight means, which is the driven weight means, has a center of gravity a predetermined number of degrees ahead of the center of gravity of the other of said first and second weight means in the direction of rotation of said shaft to lock said first and second weight means into said second position solely by means of rotational forces when a constant rotational speed is reached and maintained.

10. The combination according to claim 7 wherein said predetermined number of degrees is 5 to 10 degrees, and said stop means comprises first and second stops attached to different angular positions on said rotational mass and said engagement means is coupled with said shaft and positioned for engaging said first and second stops.

11. The combination according to claim 9 wherein said predetermined number of degrees is 5 to 10 degrees.

* * * * *